(12) United States Patent
Tsai et al.

(10) Patent No.: US 12,532,371 B2
(45) Date of Patent: Jan. 20, 2026

(54) DOWNLINK RECEPTION WITH MULTIPLE TCI STATES

(71) Applicant: MediaTek INC., Hsin-Chu (TW)

(72) Inventors: Cheng-Rung Tsai, Hsin-Chu (TW); Hsuan-Li Lin, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 455 days.

(21) Appl. No.: 18/105,760

(22) Filed: Feb. 3, 2023

(65) Prior Publication Data

US 2023/0189362 A1 Jun. 15, 2023

Related U.S. Application Data

(63) Continuation of application No. PCT/CN2021/111147, filed on Aug. 6, 2021.

(60) Provisional application No. 63/061,826, filed on Aug. 6, 2020.

(51) Int. Cl.
*H04W 76/15* (2018.01)
*H04L 5/00* (2006.01)

(52) U.S. Cl.
CPC .......... *H04W 76/15* (2018.02); *H04L 5/0051* (2013.01)

(58) Field of Classification Search
None
See application file for complete search history.

(56) References Cited

U.S. PATENT DOCUMENTS

| 2020/0007208 | A1* | 1/2020 | Zhou | H04B 7/0617 |
| 2021/0058930 | A1* | 2/2021 | Zhou | H04W 72/046 |
| 2021/0184733 | A1* | 6/2021 | Cao | H04B 7/063 |
| 2021/0274372 | A1 | 9/2021 | Shi et al. | |

FOREIGN PATENT DOCUMENTS

| CN | 111200872 A | 11/2018 |
| CN | 111436223 A | 7/2020 |
| WO | 2020076938 A1 | 4/2020 |

OTHER PUBLICATIONS

International Search Report and Written Opinion of International Search Authority for PCT/CN2021/111147, dated Oct. 27, 2021 (9 pages).
China Intellectual Property Office Action 202180059118.X Dated Apr. 18, 2025.

\* cited by examiner

*Primary Examiner* — Diane L Lo
(74) *Attorney, Agent, or Firm* — Helen Mao; Zheng Jin; Imperium Patent Works

(57) ABSTRACT

Apparatus and methods are provided for simultaneous DL transmissions. In one novel aspect, performing simultaneous DL transmissions with multiple TCI states is provided. A UE can be configured, by a BS, with a plurality of TCI states. After being configured with the TCI states, the UE can determine multiple TCI states for simultaneous DL transmissions and transmit a report to the BS to inform the BS of that the multiple TCI states are for simultaneous DL transmissions. Then, the UE applies the multiple TCI states for simultaneous DL transmissions.

18 Claims, 8 Drawing Sheets

RECEIVE A COMMAND FROM THE NETWORK FOR APPLYING THE FIRST TCI STATE AND THE SECOND TCI STATE FOR SIMULTANEOUS DL TRANSMISSIONS — 604B

FIG. 6B

DETERMINE WHETHER A DIFFERENCE IS EQUAL TO OR LESS THAN A THRESHOLD, WHEREIN THE DIFFERENCE IS BETWEEN A TIMING OF THE FIRST RS RESOURCE OR THE SECOND RS RESOURCE AND A TIMING OF RECEIVING THE COMMAND — 604C

FIG. 6C

DETERMINE WHETHER THE FIRST TCI STATE OR THE SECOND TCI STATE IS DETECTABLE — 604D

FIG. 6D

DETERMINE WHETHER A FIRST SNR OF THE FIRST RS RESOURCE OR A SECOND SNR OF THE SECOND RS RESOURCE IS GREATER THAN A THRESHOLD — 604E

FIG. 6E

DETERMINE WHETHER A FIRST SNR OF A FIRST SSB ASSOCIATED WITH THE FIRST TCI STATE OR A SECOND SNR OF A SECOND SSB ASSOCIATED WITH THE SECOND TCI STATE IS GREATER THAN A THRESHOLD ~604F

FIG. 6F

DETERMINE WHETHER A DIFFERENCE IS EQUAL TO OR LESS THAN A THRESHOLD, WHEREIN THE DIFFERENCE IS BETWEEN THE FIRST SNR OF THE FIRST RS RESOURCE AND THE SECOND SNR OF THE SECOND RS RESOURCE ~604G

FIG. 6G

DETERMINE WHETHER A DIFFERENCE IS EQUAL TO OR LESS THAN A THRESHOLD, WHEREIN THE DIFFERENCE IS BETWEEN A FIRST RSRP OF THE FIRST RS RESOURCE AND A SECOND RSRP OF THE SECOND RS RESOURCE ~604H

DOWNLINK RECEPTION WITH MULTIPLE TCI STATES

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/111147, with an international filing date of Aug. 6, 2021, which in turn claims priority from U.S. Provisional Application No. 63/061,826, entitled "Downlink reception with multi-beam operation," filed on Aug. 6, 2020. This application is a continuation of International Application No. PCT/CN2021/111147, which claims priority from U.S. provisional applications 63/061,826. International Application No. PCT/CN2021/111147 is pending as of the filing date of this application, and the United States is a designated state in International Application No. PCT/CN2021/111147. The disclosure of each of the foregoing documents is incorporated herein by reference.

TECHNICAL FIELD

The disclosed embodiments relate generally to wireless communication, and, more particularly, to downlink reception with multiple TCI states.

BACKGROUND

In conventional network of 3rd generation partnership project (3GPP) 5G new radio (NR), the user equipment (UE) can be configured, by the base station (BS), with a plurality of transmission configuration indication (TCI) state for downlink (DL) transmission. One TCI state is configured with quasi co-location information (QCL-Info), and each QCL-Info includes a reference signal (RS) and an associated QCL type.

For the network with multiple-transmission and reception point (TRP), when downlink (DL) signals and channels are transmitted from different TRPs simultaneously, the user equipment (UE) needs to support simultaneous DL transmissions with different TRPs. However, the detail has not been discussed yet.

SUMMARY

Apparatus and methods are provided for downlink (DL) reception. In one novel aspect, performing DL reception with multiple TCI states is provided. In particular, a user equipment (UE) can be configured, by a base station (BS), with a plurality of transmission configuration indication (TCI) states and a plurality of reference signal (RS) resources. Each of the TCI states associates with at least one of the RS resources. After being configured with the TCI states and the RS resources, the UE can determine multiple TCI states for DL reception and transmit a report to the BS to inform the BS of that the multiple TCI states are for DL reception. Then, the UE applies the multiple TCI states for DL reception simultaneously.

In one embodiment, a UE receives a higher layer signaling from a network. The higher layer signaling indicates to the UE a plurality of TCI states and a plurality of RS resources. Each of the TCI states associates with at least one of the RS resources. The UE determines that the UE is capable of simultaneously receiving a first RS resource and a second RS resource of the RS resources. The UE transmits a report to the network to inform the network of that that the UE is capable of simultaneously receiving the first RS resource and the second RS resource. The UE applies the first TCI state associating with the first RS resource and the second TCI state associating with the second RS resource for DL reception simultaneously.

In another embodiment, a BS transmits a higher layer signaling to a UE. The higher layer signaling indicates to the UE a plurality of TCI states and a plurality of RS resources. Each of the TCI states associates with at least one of the RS resources. The BS receives a report from the UE. The report informs the BS of that the UE is capable of simultaneously receiving a first RS resource and a second RS resource of the RS resources.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 6A to 6H are flow charts of a method of performing simultaneous DL transmissions with multiple TCI states in accordance with embodiments of the current invention.

DETAILED DESCRIPTION

Reference will now be made in detail to some embodiments of the invention, examples of which are illustrated in the accompanying drawings.

Figure 1:
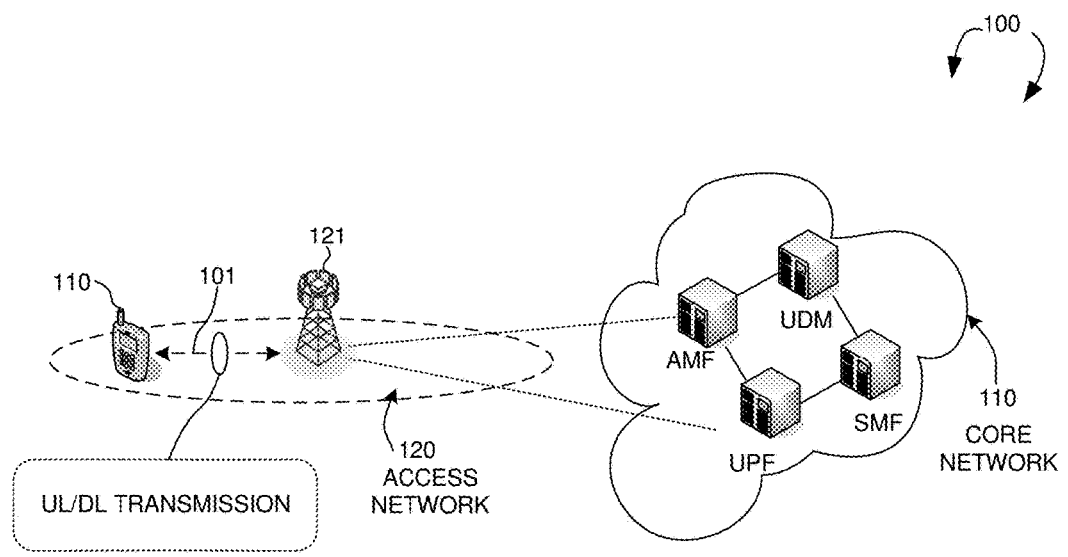
FIG. 1 illustrates an exemplary 5G new radio network supporting power control setting activation for uplink transmission in accordance with embodiments of the current invention.

FIG. 1 illustrates an exemplary 5G new radio (NR) network 100 supporting power control setting activation for uplink (UL) transmission in accordance with aspects of the current invention. The 5G NR network 100 includes a user equipment (UE) 110 communicatively connected to a gNB 121 operating in a licensed band (e.g., 30 GHz-300 GHz for mmWave) of an access network 120 which provides radio access using a Radio Access Technology (RAT) (e.g., the 5G NR technology). The access network 120 is connected to a 5G core network 130 by means of the NG interface, more specifically to a User Plane Function (UPF) by means of the NG user-plane part (NG-u), and to a Mobility Management Function (AMF) by means of the NG control-plane part (NG-c). One gNB can be connected to multiple UPFs/AMFs for the purpose of load sharing and redundancy. The UE 110 may be a smart phone, a wearable device, an Internet of Things (IoT) device, and a tablet, etc. Alternatively, UE 110 may be a Notebook (NB) or Personal Computer (PC) inserted or installed with a data card which includes a modem and RF transceiver(s) to provide the functionality of wireless communication.

The gNB 121 may provide communication coverage for a geographic coverage area in which communications with the UE 110 is supported via a communication link 101. The communication link 101 shown in the 5G NR network 100 may include UL transmissions from the UE 110 to the gNB 121 (e.g., on the Physical Uplink Control Channel (PUCCH) or Physical Uplink Shared Channel (PUSCH)) or downlink (DL) transmissions from the gNB 121 to the UE 110 (e.g., on the Physical Downlink Control Channel (PDCCH) or Physical Downlink Shared Channel (PDSCH)).

Figure 2:
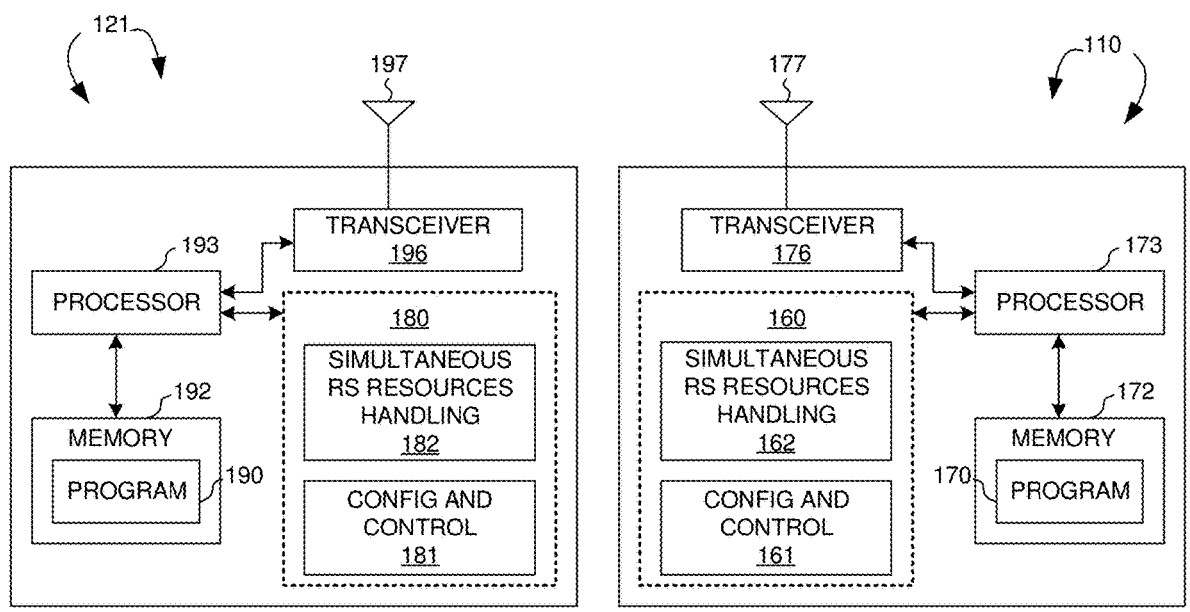
FIG. 2 is a simplified block diagram of the gNB and the UE in accordance with embodiments of the current invention.

FIG. 2 is a simplified block diagram of the gNB 121 and the UE 110 in accordance with embodiments of the present invention. For the gNB 121, an antenna 197 transmits and receives radio signal. A radio frequency (RF) transceiver module 196, coupled with the antenna, receives RF signals from the antenna, converts them to baseband signals and sends them to processor 193. RF transceiver 196 also converts received baseband signals from the processor 193, converts them to RF signals, and sends out to antenna 197. Processor 193 processes the received baseband signals and invokes different functional modules and circuits to perform features in the gNB 121. Memory 192 stores program instructions and data 190 to control the operations of the gNB 121.

Similarly, for the UE 110, antenna 177 transmits and receives RF signals. RF transceiver module 176, coupled with the antenna, receives RF signals from the antenna, converts them to baseband signals and sends them to processor 173. The RF transceiver 176 also converts received baseband signals from the processor 173, converts them to RF signals, and sends out to antenna 177. Processor 173 processes the received baseband signals and invokes different functional modules and circuits to perform features in the UE 110. Memory 172 stores program instructions and data 170 to control the operations of the UE 110.

The gNB 121 and the UE 110 also include several functional modules and circuits that can be implemented and configured to perform embodiments of the present invention. In the example of FIG. 2, the gNB 121 includes a set of control functional modules and circuit 180. Simultaneous reference signal (RS) resources handling circuit 182 configures DL reception for the UE 110. Configuration and control circuit 181 provides different parameters to configure and control the UE 110. The UE 110 includes a set of control functional modules and circuit 160. Simultaneous RS resources handling circuit 162 configures, cooperatively with the BS, DL reception for different transmission and reception points (TRPs). Configuration and control circuit 161 handles configuration and control parameters from the gNB 121.

Note that the different functional modules and circuits can be implemented and configured by software, firmware, hardware, and any combination thereof. The function modules and circuits, when executed by the processors 193 and 173 (e.g., via executing program codes 190 and 170), allow the gNB 121 and the UE 110 to perform embodiments of the present invention.

Figure 3A:
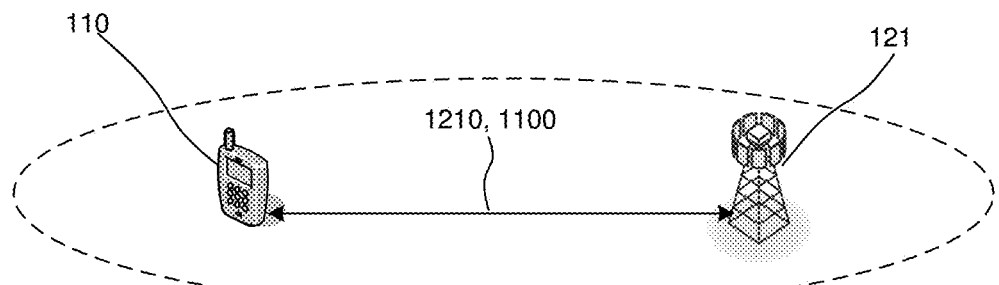
FIG. 3A illustrates one embodiment of message transmissions in accordance with embodiments of the current invention.
Figure 3B:
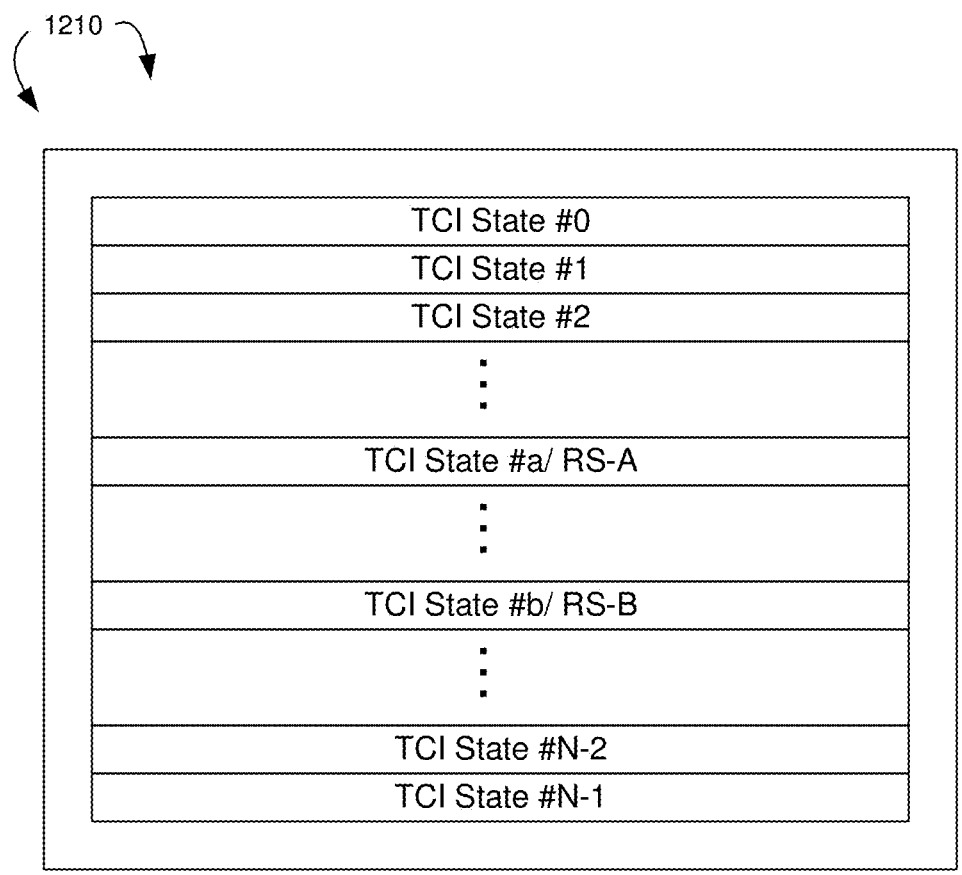
FIG. 3B illustrates one embodiment of the higher layer signaling in accordance with embodiments of the current invention.

FIG. 3A illustrates one embodiment of message transmissions in accordance with one novel aspect. In particular, the gNB 121 transmits a higher layer signaling 1210 to the UE 110. The UE 110 receives the higher layer signaling 1210 from the gNB 121. The higher layer signaling 1210 indicates to the UE 110 a plurality of TCI states '#0' to '#N−1' and a plurality of RS resources. Each of the TCI states '#0' to '#N−1' associates with at least one of the RS resources. It should be noted that the higher layer signaling 1210 may be a radio resource control (RRC) signal.

In this embodiment, the UE 110 selects an RS resource 'RS-A' associated with a TCI state '#a' and an RS resource 'RS-B' associated with a TCI state '#b' from the RS resources, and determines that the UE 110 is capable of simultaneously receiving the RS resource 'RS-A' and the RS resource 'RS-B'. Then, the UE 110 transmits a report 1100 to the gNB 121 to inform the gNB 121 of that the UE 110 is capable of simultaneously receiving the RS resource 'RS-A' and the RS resource 'RS-B'. After transmitting the report 1100, the UE 110 applies the TCI state '#a' associating with the RS resource 'RS-A' and the TCI state '#b' associating with the RS resource 'RS-B' for DL reception simultaneously.

Figure 4A:
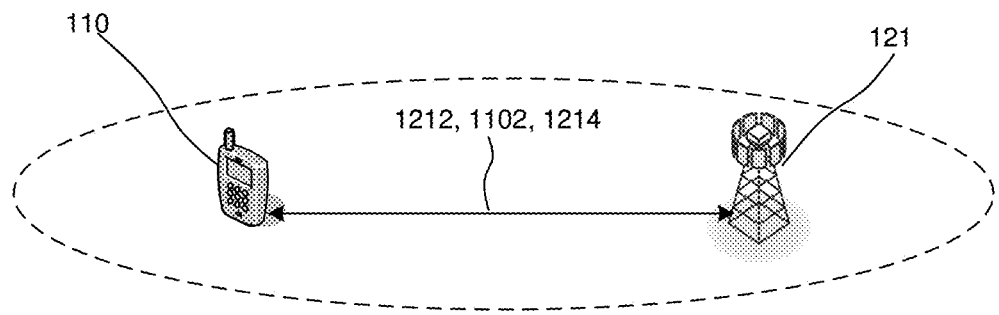
FIG. 4A illustrates one embodiment of message transmissions in accordance with embodiments of the current invention.
Figure 4B:
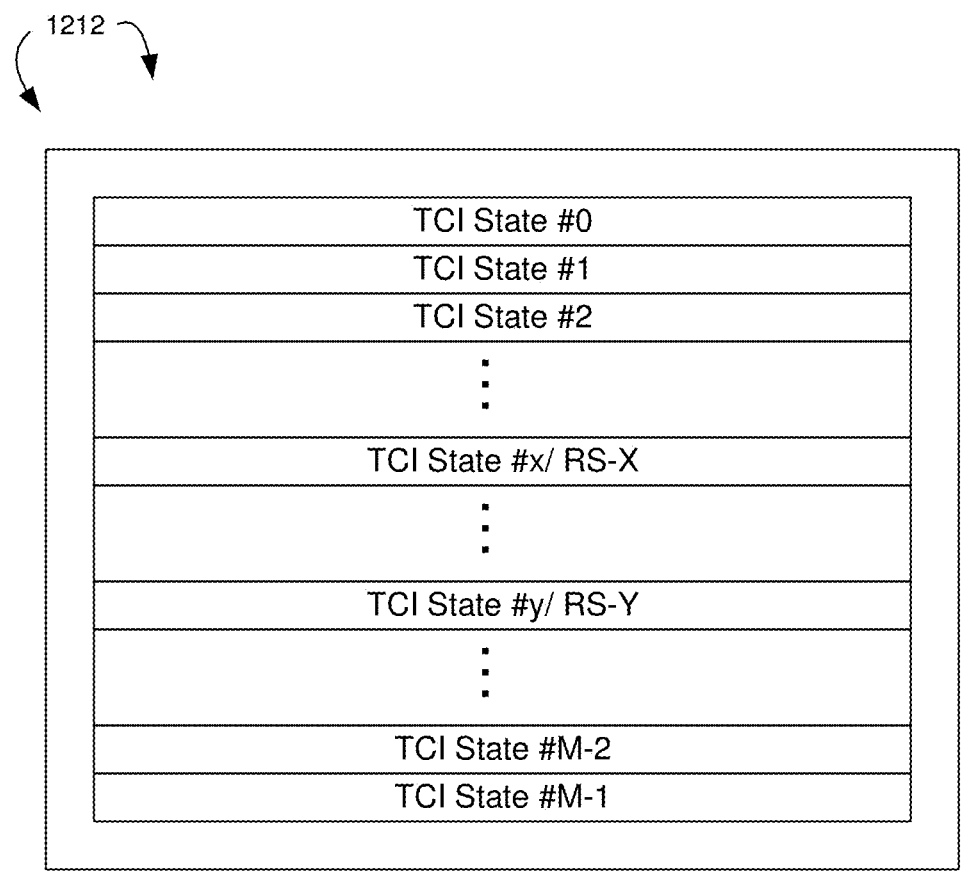
FIG. 4B illustrates one embodiment of the higher layer signaling in accordance with embodiments of the current invention.

FIG. 4A illustrates one embodiment of message transmissions in accordance with one novel aspect. In particular, the gNB 121 transmits a higher layer signaling 1212 to the UE 110. The UE 110 receives the higher layer signaling 1212 from the gNB 121. The higher layer signaling 1212 indicates to the UE 110 a plurality of TCI states '#0' to '#M−1' and a plurality of RS resources. Each of the TCI states '#0' to '#M−1' associates with at least one of the RS resources. It should be noted that the higher layer signaling 1212 may be a RRC signal.

In this embodiment, the UE 110 selects an RS resource 'RS-X' associated with a TCI state '#x' and an RS resource 'RS-Y' associated with a TCI state '#y' from the RS resources, and determines that the UE 110 is capable of simultaneously receiving the RS resource 'RS-X' and the RS resource 'RS-Y'. Then, the UE 110 transmits a report 1102 to the gNB 121 to inform the gNB 121 of that the UE 110 is capable of simultaneously receiving the RS resource 'RS-X' and the RS resource 'RS-Y'. After transmitting the report 1102 to the gNB 121, the UE 110 applies the TCI state '#x' associating with the RS resource 'RS-X' and the TCI state '#y' associating with the RS resource 'RS-Y' for DL reception simultaneously.

For example, TCI state '#1' includes an RS resource '#1' with Quasi Co-Location (QCL) Type-A and QCL Type-D and TCI state '#2' includes an RS resource '#2' with QCL Type-A and QCL Type-D. The UE 110 determines whether the RS resource '#1' of the TCI state '#1' and the RS resource '#2' of the TCI state '#2' can be received simultaneously. In this example, it is determined that the RS resource '#1' of the TCI state '#1' and the RS resource '#2' of the TCI state '#2' can be received simultaneously. Then, the UE 110 transmits the report 1102 to the gNB 121 to inform the gNB 121 of that the UE 110 is capable of simultaneously receiving the RS resource '#1' and the RS resource '#2. The report 1102 includes: (1) the RS resource'#1' and the RS resource '#2' in a beam group/pair that can be received simultaneously by the UE 110; and (2) Layer 1-RSRPs corresponding to the RS resource '#1' and the RS resource '#2'. After transmitting the report 1102, the UE 110 applies the TCI state '#1' associating with the RS resource '#1' and the TCI state '#2' associating with the RS resource '#2' for DL reception simultaneously.

In some embodiments, before applying the TCI state '#x' and the TCI state '#y' for DL reception simultaneously, at least one of the following implementations need to be fulfilled.

In one implementation, after receiving the report 1102, the gNB 121 confirms that the UE 110 can receive the RS resource 'RS-X' and the RS resource 'RS-Y' for simultaneous DL transmissions. Accordingly, the gNB 121 transmits a command 1214 to the UE 110 for the UE 110 to apply the TCI state '#x' associating with the RS resource 'RS-X' and the TCI state '#y' associating with the RS resource 'RS-Y' for simultaneous DL transmissions. After receiving the command 1214, the UE 110 then applies the TCI state '#x' and the TCI state '#y' for DL reception simultaneously according to the command 1214.

In one implementation, the UE 110 calculates a difference between a timing the RS resource 'RS-X' or 'RS-Y' and a timing of receiving the command 1214. The UE 110 determines whether the difference is equal to or less than a threshold (e.g., 1280 milliseconds). When the difference is equal to or less than the time threshold, the UE 110 applies the TCI state '#x' associating with the RS resource 'RS-X' and the TCI state '#y' associating with the RS resource 'RX-Y' for DL reception simultaneously. When the difference is greater than the threshold, the UE 110 may not apply the TCI state '#x' associating with the RS resource 'RS-X' and the TCI state '#y' associating with the RS resource 'RS-Y' for DL reception simultaneously.

In one implementation, the UE 110 determines whether the TCI state '#x' and the TCI state '#y' are detectable. When the TCI state '#x' and the TCI state '#y' are detectable, the UE 110 applies the TCI state '#x' and the TCI state '#y' for DL reception simultaneously. When the TCI state '#x' or the TCI state '#y' is not detectable, the UE 110 may not apply the TCI state '#x' and the TCI state '#y' for DL reception simultaneously.

In one implementation, the UE 110 determines whether a first signal noise ratio (SNR) of the RS resource 'RS-X' or a second SNR of the RS resource 'RS-Y' is greater than a threshold (e.g., −3 dB). When the first SNR of the RS resource 'RS-X' and the second SNR of the RS resource 'RS-Y' are respectively greater than the threshold, the UE 110 applies the TCI state '#x' associating with the RS resource 'RS-X' and the TCI state '#y' associating with the RS resource 'RS-Y' for DL reception simultaneously. When the first SNR of the RS resource 'RS-X' or the second SNR of the RS resource 'RS-Y' is not greater than the threshold, the UE 110 may not apply the TCI state '#x' associating with the RS resource 'RS-X' and the TCI state '#y' associating with the RS resource 'RS-Y' for DL reception simultaneously.

In one implementation, the UE 110 determines whether a first SNR of a first synchronization signal block (SSB) associated with the TCI state '#x' or a second SNR of a second SSB associated with the TCI state '#y' is greater than a threshold (e.g., −4 dB). When the first SNR of the first SSB associated with the TCI state '#x' and the second SNR of the second SSB associated with the TCI state '#y' are respectively greater than the threshold, the UE 110 applies the TCI state '#x' and the TCI state '#y' for DL reception simultaneously. When the first SNR of the first SSB associated with the TCI state '#x' or the second SNR of the second SSB associated with the TCI state '#y' is not greater than the threshold, the UE 110 may not apply the TCI state '#x' and the TCI state '#y' for DL reception simultaneously.

In one implementation, the UE 110 calculates a difference between a first SNR of the RS resource 'RS-X' and a second SNR of the RS resource 'RS-Y'. The UE 110 determines whether the difference is equal to or less than a threshold (e.g., 4 dB). When the difference between the first SNR of the RS resource 'RS-X' and the second SNR of the RS resource 'RS-Y' is equal to or less than the threshold, the UE 110 applies the TCI state '#x' associating with the RS resource 'RS-X' and the TCI state '#y' associating with the RS resource 'RS-Y' for DL reception simultaneously. When the difference between the first SNR of the RS resource 'RS-X' and the second SNR of the RS resource 'RS-Y' is greater than the threshold, the UE 110 may not apply the TCI state '#x' associating with the RS resource 'RS-X' and the TCI state '#y' associating with the RS resource 'RS-Y' for DL reception simultaneously.

In one implementation, the UE 110 calculates a difference between a first reference signal receiving power (RSRP) of the RS resource 'RS-X' and a second RSRP of the RS resource 'RS-Y'. The UE 110 determines whether the difference is equal to or less than a threshold (e.g., 6 dB). When the difference between the first RSRP of the RS resource 'RS-X' and the RSRP of the RS resource 'RS-Y' is equal to or less than the threshold, the UE 110 applies the TCI state '#x' associating with the RS resource 'RS-X' and the TCI state '#y' associating with the RS resource RS-Y' DL reception simultaneously. When the difference between the first RSRP of the RS resource 'RS-X' and the second RSRP of the RS resource 'RS-Y' is greater than the threshold, the UE 110 may not apply the TCI state '#x' associating with the RS resource 'RS-X' and the TCI state '#y' associating with the RS resource 'RS-Y' for DL reception simultaneously.

Figure 5:
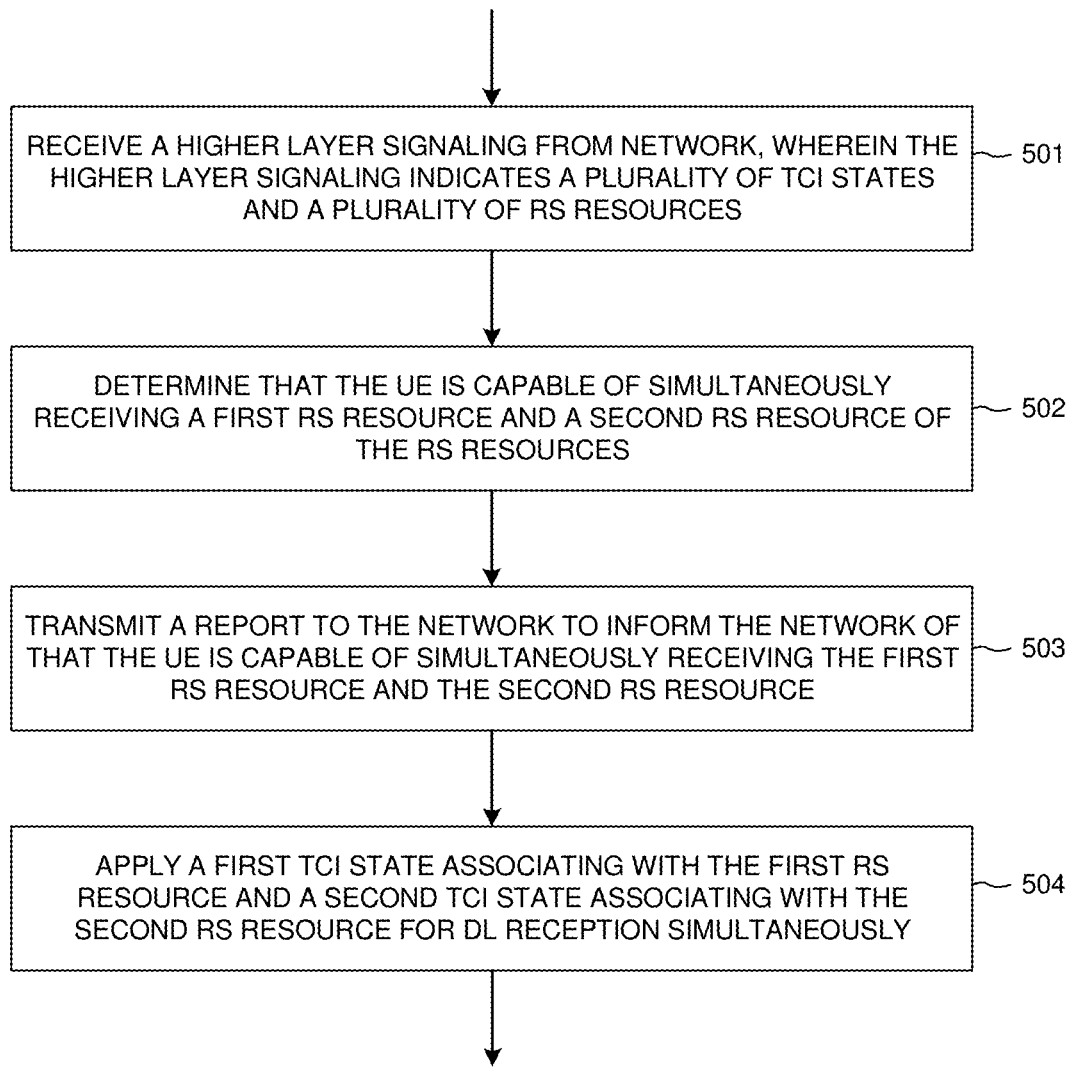
FIG. 5 is a flow chart of a method of performing simultaneous DL transmissions with multiple TCI states in accordance with embodiments of the current invention.
Figure 6A:
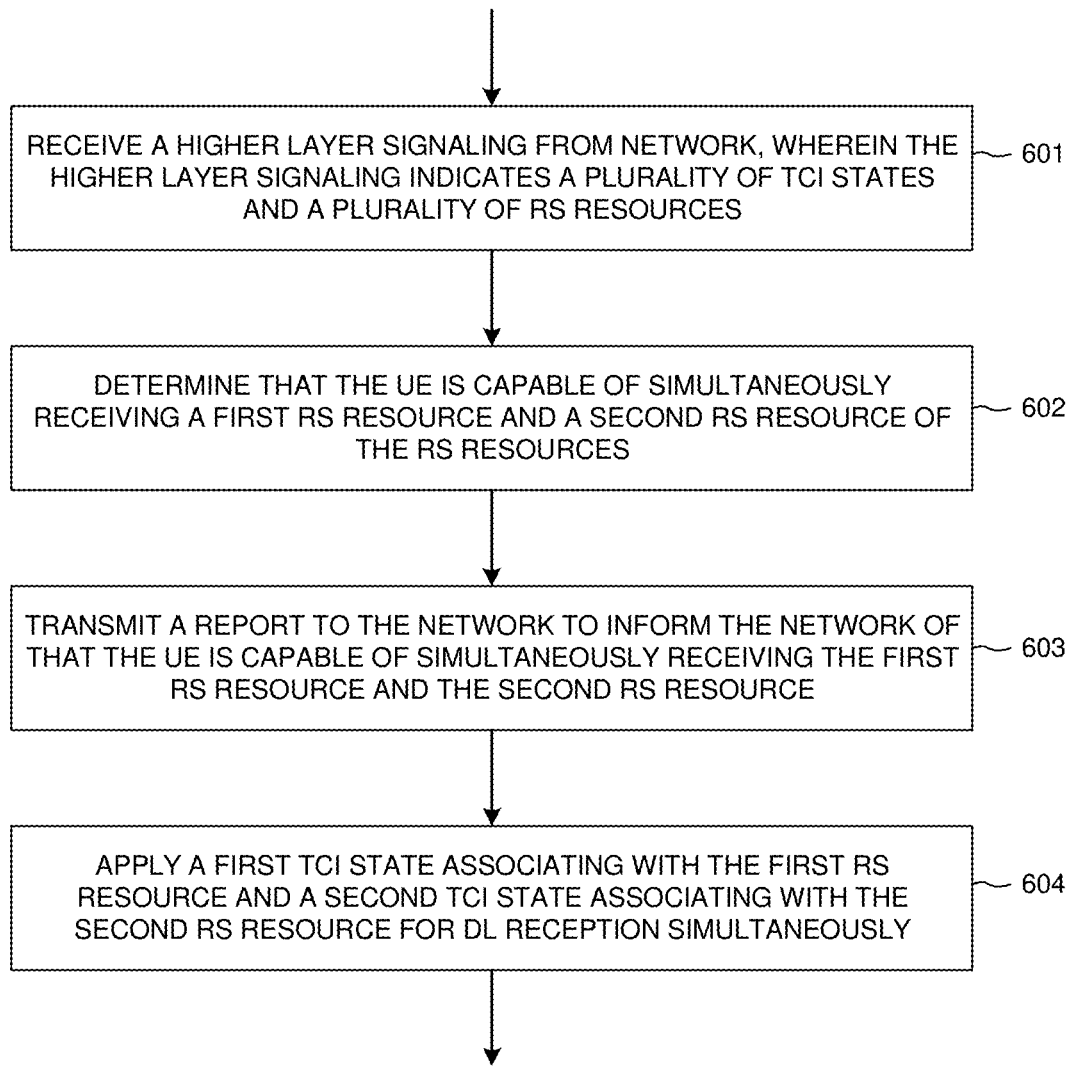

FIG. 5 is a flow chart of a method of performing DL reception with multiple TCI states in accordance with one novel aspect. In step 501, a UE receives a higher layer signaling from a network. The higher layer signaling indicates to the UE a plurality of TCI states and a plurality of RS resources. Each of the TCI states associates with at least one of the RS resources. In step 502, the UE determines that the UE is capable of simultaneously receiving a first RS resource and a second RS resource of the RS resources. In step 503, the UE transmits a report to the network to inform the network of that that the UE is capable of simultaneously receiving the first RS resource and the second RS resource. In step 504, the UE applies a first TCI state associating with the first RS resource and a second TCI state associating with the second RS resource for DL reception simultaneously.

FIGS. 6A to 6H are flow charts of a method of performing simultaneous DL transmissions with multiple TCI states in accordance with one novel aspect. In step 601, a UE receives a higher layer signaling from a network. The higher layer signaling indicates to the UE a plurality of TCI states and a plurality of RS resources. Each of the TCI states associates with at least one of the RS resources. In step 602, the UE determines that the UE is capable of simultaneously receiving a first RS resource and a second RS resource of the RS resources.

In step 603, the UE transmits a report to the network to inform the network of that the UE is capable of simultaneously receiving the first RS resource and the second RS resource. In step 604, the UE applies a first TCI state associating with the first RS resource and a second TCI state associating with the second RS resource for DL reception simultaneously.

In some embodiments, before step 604 of applying the first TCI state and the second TCI state for DL reception simultaneously, at least one of the following steps may be optionally performed by the UE.

In step 604B, the UE receives a command from the network for applying the first TCI state associating with the first RS resource and the second TCI state associating with the second RS resource for DL reception simultaneously. Then the UE performs the step 604 according to the command. In some implementations, the step 604B should be performed after the step 603.

In step 604C, the UE determines whether a difference is equal to or less than a threshold. The difference is between a timing of the first RS resource or the second RS resource and a timing of receiving the command. The UE performs step 604 when the difference is equal to or less than the threshold.

In step 604D, the UE determines whether the first TCI state or the second TCI state is detectable. The UE performs step 604 when the first TCI state and the second TCI state are detectable.

In step 604E, the UE determines whether a first SNR of the first RS resource or a second SNR of the second RS resource is greater than a threshold. The UE performs step 604 when the first SNR of the first RS resource and the second SNR of the second RS resource are respectively greater than the threshold.

In step 604F, the UE determines whether a first SNR of a first SSB associated with the first TCI state or a second SNR of a second SSB associated with the second TCI state is greater than a threshold. The UE performs step 604 when the first SNR of the first SSB associated with the first TCI state and the second SNR of the second SSB associated with the second TCI state are greater than the threshold.

In step 604G, the UE determines whether a difference is equal to or less than a threshold. The difference is between the first SNR of the first RS resource and the second SNR of the second RS resource. The UE performs step 604 when the difference is equal to or less than the threshold.

In step 604H, the UE determines whether a difference is equal to or less than a threshold. The difference is between a first RSRP of the first RS resource and a second RSRP of the second RS resource. The UE performs step 604 when the difference is equal to or less than the threshold.

Figure 7:
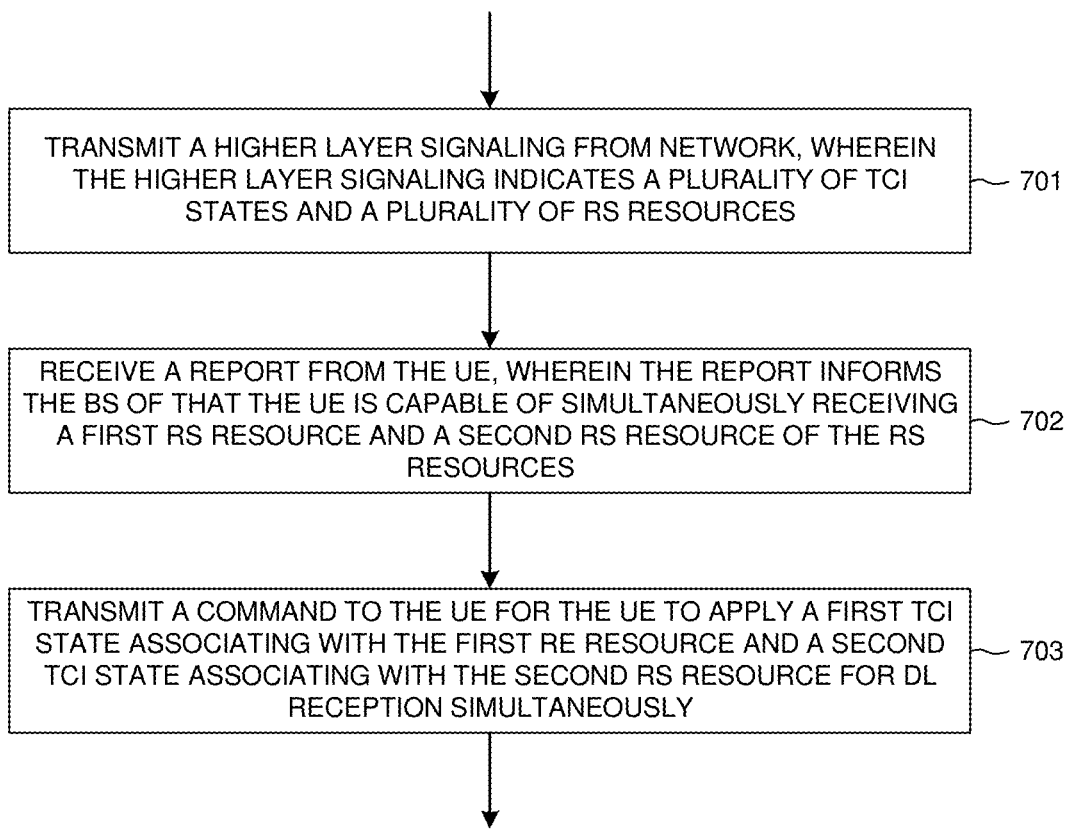
FIG. 7 is a flow chart of a method of performing simultaneous DL transmissions with multiple TCI states in accordance with embodiments of the current invention.

FIG. 7 is a flow chart of a method of performing DL reception with multiple TCI states in accordance with one novel aspect. In step 701, a BS transmits a higher layer signaling from a network. The higher layer signaling indicates to the UE a plurality of TCI states and a plurality of RS resources. Each of the TCI states associates with at least one of the RS resources. In step 702, the BS receives a report from the UE. The report informs the BS of that the UE is capable of simultaneously receiving a first RS resource and a second RS resource of the RS resources. In step 703, the BS transmits a command to the UE for the UE to apply a first TCI state associating with the first RS resource and a second TCI state associating with the second RS resource for DL reception simultaneously.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving, by a user equipment (UE), a higher layer signaling from a network, wherein the higher layer signaling indicates to the UE a plurality of transmission configuration indication (TCI) states and a plurality of reference signal (RS) resources, and each of the TCI states associates with at least one of the RS resources;
   determining, by the UE, that the UE is capable of simultaneously receiving a first RS resource and a second RS resource of the RS resources;
   transmitting, by the UE, a report to the network to inform the network of that the UE is capable of simultaneously receiving the first RS resource and the second RS resource;
   determining, by the UE, whether the first TCI state and the second TCI state are detectable; and
   applying, by the UE, a first TCI state associating with the first RS resource and a second TCI state associating with the second RS resource for downlink (DL) reception simultaneously when the first TCI state and the second TCI state are detectable.

2. The method of claim 1, further comprising:
   receiving, by the UE, a command from the network, wherein the command indicates the UE to switch to the first TCI state and the second TCI state.

3. The method of claim 2, further comprising:
   determining, by the UE, whether a difference is equal to or less than a threshold, wherein the difference is between a timing of the first RS resource or the second RS resource and a timing of receiving the command;
   wherein the step of applying the first TCI state and the second TCI state for DL reception simultaneously further comprises:
      applying, by the UE, the first TCI state and the second TCI state for DL reception simultaneously when the difference is equal to or less than the threshold.

4. The method of claim 1, wherein the step of determining whether the first TCI state and the second TCI state are detectable further comprises:
   determining, by the UE, whether a first signal noise ratio (SNR) of the first RS resource or a second SNR of the second RS resource is greater than a threshold;
   wherein the step of applying the first TCI state and the second TCI state for DL reception simultaneously when the first TCI state and the second TCI state are detectable further comprises:
      applying, by the UE, the first TCI state and the second TCI state for DL reception simultaneously when the first SNR of the first RS resource and the second SNR of the second RS resource are respectively greater than the threshold.

5. The method of claim 1, wherein the step of determining whether the first TCI state and the second TCI state are detectable further comprises:
   determining, by the UE, whether a first signal noise ratio (SNR) of a first synchronization signal block (SSB) associated with the first TCI state or a second SNR of a second SSB associated with the second TCI state is greater than a threshold;
   wherein the step of applying the first TCI state and the second TCI state for DL reception simultaneously when the first TCI state and the second TCI state are detectable further comprises:
      applying, by the UE, the first TCI state and the second TCI state for DL reception simultaneously when the first SNR of the first SSB and the second SNR of the second SSB are respectively greater than the threshold.

6. The method of claim 1, further comprising:
determining, by the UE, whether a difference is equal to or less than a threshold, wherein the difference is between a first signal noise ratio (SNR) of the first RS resource and a second SNR of a second RS resource;
wherein the step of applying the first TCI state and the second TCI state for DL reception simultaneously further comprises:
applying, by the UE, the first TCI state and the second TCI state for DL reception simultaneously when the difference is equal to or less than the threshold.

7. The method of claim 1, further comprising:
determining, by the UE, whether a difference is equal to or less than a threshold, wherein the difference is between a first reference signal receiving power (RSRP) of the first RS resource and a second RSRP of the second RS resource;
wherein the step of applying the first TCI state and the second TCI state for DL reception simultaneously further comprises:
applying, by the UE, the first TCI state and the second TCI state for DL reception simultaneously when the difference is equal to or less than the threshold.

8. A user equipment (UE) comprising:
a transceiver that receives a higher layer signaling from a network, wherein the higher layer signaling indicates to the UE a plurality of transmission configuration indication (TCI) states and a plurality of reference signal (RS) resources, and each of the TCI states associates with at least one of the RS resources; and
a simultaneous RS resources handling circuit that determines that the UE is capable of simultaneously receiving a first RS resource and a second RS resource of the RS resource;
wherein the transceiver transmits a report to the network to inform the network of that the UE is capable of simultaneously receiving the first RS resource and the second RS resource, and the simultaneous RS resources handling circuit determines whether the first TCI state and the second TCI state are detectable, and applies a first TCI state associating with the first RS resource and a second TCI state associating with the second RS resource for downlink (DL) reception simultaneously when the first TCI state and the second TCI state are detectable.

9. The UE of claim 8, wherein the transceiver further receives a command from the network for the simultaneous RS resources handling circuit to switch to the first TCI state and the second TCI state.

10. The UE of claim 9, wherein the simultaneous RS resources handling circuit further:
determines whether a difference is equal to or less than a threshold, wherein the difference is between a timing of the first RS resource or the second RS resource and a timing of receiving the command; and
applies the first TCI state and the second TCI state for DL reception simultaneously when the difference is equal to or less than the threshold.

11. The UE of claim 8, wherein the simultaneous RS resources handling circuit further:
determines whether a signal noise ratio (SNR) of the first RS resource or a SNR of the second RS resource is greater than a threshold; and
applies the first TCI state and the second TCI state for DL reception simultaneously when the SNR of the first RS resource and the SNR of the second RS resource are respectively greater than the threshold.

12. The UE of claim 8, wherein the simultaneous RS resources handling circuit further:
determines whether a signal noise ratio (SNR) of a first synchronization signal block (SSB) associated with the first TCI state or an SNR of a second SSB associated with the second TCI state is greater than a threshold; and
applies the first TCI state and the second TCI state for DL reception simultaneously when the SNR of the first SSB and the SNR of the second SSB are respectively greater than the threshold.

13. The UE of claim 8, wherein the simultaneous RS resources handling circuit further:
determines whether a difference is equal to or less than a threshold, wherein the difference is between a signal noise ratio (SNR) of the first RS resource and a SNR of the second RS resource; and
applies the first TCI state and the second TCI state for DL reception simultaneously when the difference is equal to or less than a threshold.

14. The UE of claim 8, wherein the simultaneous RS resources handling circuit further:
determines whether a difference is equal to or less than a threshold, wherein the difference is between a first reference signal receiving power (RSRP) of the first RS resource and a second RSRP of the second RS resource; and
applies the first TCI state and the second TCI state for DL reception simultaneously when the difference is equal to or less than a threshold.

15. A method, comprising:
transmitting, by a base station (BS), a higher layer signaling to a user equipment (UE), wherein the higher layer signaling indicates to the UE a plurality of transmission configuration indication (TCI) states and a plurality of reference signal (RS) resources, and each of the TCI states associates with at least one of the RS resources; and
receiving, by the BS, a report from the UE, wherein the report informs the BS of that the UE is capable of simultaneously receiving a first RS resource and a second RS resource of the RS resources, and wherein the UE applies a first TCI state associating with the first RS resource and a second TCI state associating with the second RS resource for downlink (DL) reception simultaneously when the first TCI state and the second TCI state are detectable.

16. The method of claim 15, further comprising:
transmitting, by the BS, a command to the UE for indicating the UE to switch to the first TCI state associating with the first RS resource and the second TCI state associating with the second RS resource.

17. A base station (BS), comprising:
a transceiver that:
transmits a higher layer signaling to a user equipment (UE), wherein the higher layer signaling indicates to the UE a plurality of transmission configuration indication (TCI) states and a plurality of reference signal (RS) resources, and each of the TCI states associates with at least one of the RS resources; and
receives a report from the UE, wherein the report informs the BS of that the UE is capable of simultaneously receiving a first RS resource and a second RS resource of the RS resources, and wherein the UE applies a first TCI state associating with the first RS resource and a second TCI state associating with the second RS resource for downlink (DL) reception simultaneously when the first TCI state and the second TCI state are detectable.

18. The BS of claim 17, further comprising:
a simultaneous RS resources handling circuit that determines a command for the UE to apply the first TCI state associating with the first RS resource and the second TCI state associating with the second RS resource for downlink (DL) reception simultaneously;
wherein the transceiver transmits the command to the UE for the UE to switch to the first TCI state and the second TCI state.

* * * * *